United States Patent
Kurasako et al.

(12) 
(10) Patent No.: US 6,378,669 B1
(45) Date of Patent: Apr. 30, 2002

(54) VEHICULAR BRAKE APPARATUS AND CONTROL METHOD

(75) Inventors: Ryoichi Kurasako, Nishikamo-gun; Masayuki Soga, Susono, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/698,022

(22) Filed: Oct. 30, 2000

(30) Foreign Application Priority Data

Nov. 10, 1999 (JP) .......................................... 11-319824

(51) Int. Cl.[7] .............................................. F16D 65/10
(52) U.S. Cl. ................................ 188/218 XL; 188/382; 303/191
(58) Field of Search ....................... 188/1.11 R, 1.11 W, 188/1.11 L, 1.11 E, 218 XL, 71.7, 382; 303/87, 191, DIG. 1

(56) References Cited

U.S. PATENT DOCUMENTS 4,865,395 A * 9/1989 Fukushima ................... 303/87
5,205,309 A * 4/1993 Cardenas et al. .............. 303/87
5,403,072 A * 4/1995 Kilian et al. ............ 188/1.11 R

FOREIGN PATENT DOCUMENTS

EP 0 155 530 A2 * 9/1985 ............ 188/1.11 R
JP 04-278872 10/1992

* cited by examiner

Primary Examiner—Paul N. Dickson
Assistant Examiner—Thomas J. Williams
(74) Attorney, Agent, or Firm—Oliff & Berridge PLC

(57) ABSTRACT

A vehicular brake apparatus includes a disc brake mechanism that brakes rotation of a wheel by pressing a friction member against a brake disc. The vehicular brake apparatus has a wall thickness detector that detects a state of wall thickness of the brake disc, and a controller that controls a state of contact between the brake disc and the friction member. Based on the state of wall thickness of the brake disc detected by the wall thickness detector, the controller controls the state of contact between the brake disc and the friction member so that the friction member contacts a relatively great wall thickness portion of the brake disc more strongly than the friction member contacts a relatively small wall thickness portion of the brake disc. The brake apparatus is able to eliminate the wall thickness variation of the brake disc or suppress occurrence of a wall thickness variation.

18 Claims, 3 Drawing Sheets

(FIRST EMBODIMENT)

(SECOND EMBODIMENT)

VEHICULAR BRAKE APPARATUS AND CONTROL METHOD

INCORPORATION BY REFERENCE

The disclosure of Japanese Patent Application No. 11 319824 filed on Nov. 10, 1999 including the specification, drawings and abstract is incorporated herein by reference in its entirety.

BACKGROUND OF THE INVENTION

1. Field of the Invention

The invention relates to a vehicular brake apparatus for braking a vehicle and to a control method for the apparatus. More particularly, the invention relates to a vehicular brake apparatus capable of detecting a variation in wall thickness of a disc brake and eliminating or suppressing the wall thickness variation, and to a control method for the apparatus.

2. Description of Related Art

A vehicular brake apparatus described in Japanese Laid-Open Application No. 4-278872 brakes the vehicle by braking rotations of wheels. To brake rotation of the wheels, brake pads (friction members) are pressed against brake discs connected to the wheels so as to cause friction forces between the brake discs and the brake pads.

However, it is difficult to set the rotating axis of a wheel perfectly perpendicular to a brake disc. Therefore, it is often the case that a brake disc slightly wobbles while rotating. If brake pads are pressed against a brake disc turning in a wobbling state, there occurs a slight wall thickness variation in a circumferential direction of the brake disc. Occurrence of such a variation in wall thickness may become a cause of vibrations of the wheel during braking, or may cause the reaction force exerted on the brake pedal to finely fluctuate, and may give a disagreeable feel to a driver of the vehicle.

If the wall thickness variation of a brake disc is great, a portion of the brake disc may contact a brake pad even when brake operation is not performed, that is, generally termed brake dragging may occur. If such brake dragging occurs, a problem of an accelerated wear of the brake pads is likely to occur.

SUMMARY OF THE INVENTION

Accordingly, it is one object of the invention to provide a vehicular brake apparatus and control method capable of detecting a variation in the wall thickness of a brake disc and capable of eliminating the wall thickness variation.

In accordance with one aspect of the invention, a vehicular brake apparatus having a disc brake mechanism that brakes rotation of a wheel by pressing a friction member against a brake disc, includes a wall thickness detector and a controller. The wall thickness detector detects a state of wall thickness, of the brake disc. The controller controls a state of contact between the brake disc and the friction member. Based on the state of wall thickness of the brake disc detected by the wall thickness detector, the controller controls the state of contact between the brake disc and the friction member in such a fashion that the friction member contacts a relatively great wall thickness portion of the brake disc more strongly than a relatively small wall thickness portion of the brake disc.

The vehicular brake apparatus of this aspect of the invention detects a state of wall thickness of the disc brake (a state of wall thickness variation) by using the wall thickness detector. Based on a result of the detection, the apparatus actively performs a control such that the friction member contacts a portion of the brake disc having a relatively great wall thickness more strongly than a portion of the brake disc having a relatively small wall thickness (including a control such that the friction member is kept from contacting the relatively small wall thickness portion). In this manner, the apparatus is able to decrease, the thickness of the relatively great wall thickness portion of the brake disc and thereby eliminate the wall thickness variation of the disc. The apparatus is also able to suppress generation of a variation in the wall thickness of the brake disc. Therefore, the apparatus is able to prevent problems attributed to a variation in the wall thickness of the brake disc, for example, vibrations during braking, and the like.

The state of contact between the brake disc and the friction member may be controlled while a vehicle is not under braking. Therefore, since the control for eliminating (suppressing) a variation in the wall thickness of the brake disc is performed while the vehicle is not under braking, the state of contact between the brake disc and the friction member can be set to an optimal state for eliminating (suppressing) the wall thickness variation of the brake disc. Hence, the wall thickness variation of the brake disc can be more effectively eliminated (suppressed).

The controller may cause the friction member to contact a portion of the brake disc having a relatively great wall thickness, while preventing the friction member from contacting a portion of the brake disc having a relatively small wall thickness. Therefore, since the friction member is not caused to contact a relatively small wall thickness portion of the brake disc, it becomes possible to reduce the wear of the friction member, in addition to the advantage of decreasing a thickness of the relatively great wall thickness portion of the brake disc. This can eliminate a variation in the wall thickness of the disc brake.

The controller may also variably control a force of the friction member pressing the brake disc in correspondence to a wall thickness variation of the brake disc. Therefore, since the state of contact between the brake disc and the friction member is variably controlled in correspondence to the state of wall thickness of the brake disc, it becomes possible to more quickly eliminate any wall thickness variation of the brake disc and more effectively make the wall thickness of the brake disc uniform.

The vehicular brake apparatus may further have the following construction. That is, the disc brake mechanism may be a hydraulic brake mechanism that presses the friction member against the brake disc by raising a brake liquid pressure in a wheel cylinder. The wall thickness detector may detect the state of wall thickness of the brake disc from a variation in the brake liquid pressure during braking of a vehicle. The controller controls the state of contact between the brake disc and the friction member by adjusting the brake liquid pressure. This construction makes it possible to perform the detection of the state of wall thickness of the brake disc by the wall thickness state detector and the control of the state of contact between the brake disc and the friction member by the controller, through the use of the brake liquid pressure. Therefore, by controlling the brake liquid pressure, a variation in the wall thickness of the brake disc can be eliminated (suppressed).

A vehicular brake apparatus in accordance with another aspect of the invention includes a disc brake mechanism, a fluctuation detector that detects a brake fluctuation, and a wall thickness state detector that detects a state of wall thickness of the brake disc based on the brake fluctuation. As a brake fluctuation, it is possible to detect a fluctuation in brake pressure in a wheel cylinder or a fluctuation in the torque of an electric motor that occurs together with rotation of a wheel.

In this vehicular brake apparatus, the state of wall thickness of the disc brake is detected based on, for example, a brake pressure fluctuation per rotation of the disc brake. Therefore, the apparatus is able to detect a wall thickness of the disc brake corresponding to the rotational position (angle) of the disc brake.

Still another aspect of the invention provides a control method for a vehicular brake apparatus having a disc brake mechanism that brakes rotation of a wheel by pressing a friction member against a brake disc. In the method, a state of wall thickness of the brake disc is detected. Based on the detected state of wall thickness of the brake disc, a state of contact between the brake disc and the friction member is controlled in such a fashion that the friction member contacts a relatively great wall thickness portion of the brake disc more strongly than it contacts a relatively small wall thickness portion of the brake disc.

BRIEF DESCRIPTION OF THE DRAWINGS

The foregoing and further objects, features and advantages of the invention will become apparent from the following description of preferred embodiments with reference to the accompanying drawings, in which like numerals are used to represent like elements and wherein.

DETAILED DESCRIPTION OF PREFERRED EMBODIMENTS

Preferred embodiments of the vehicular brake apparatus of the invention will be described with reference to the accompanying drawings.

Figure 1:
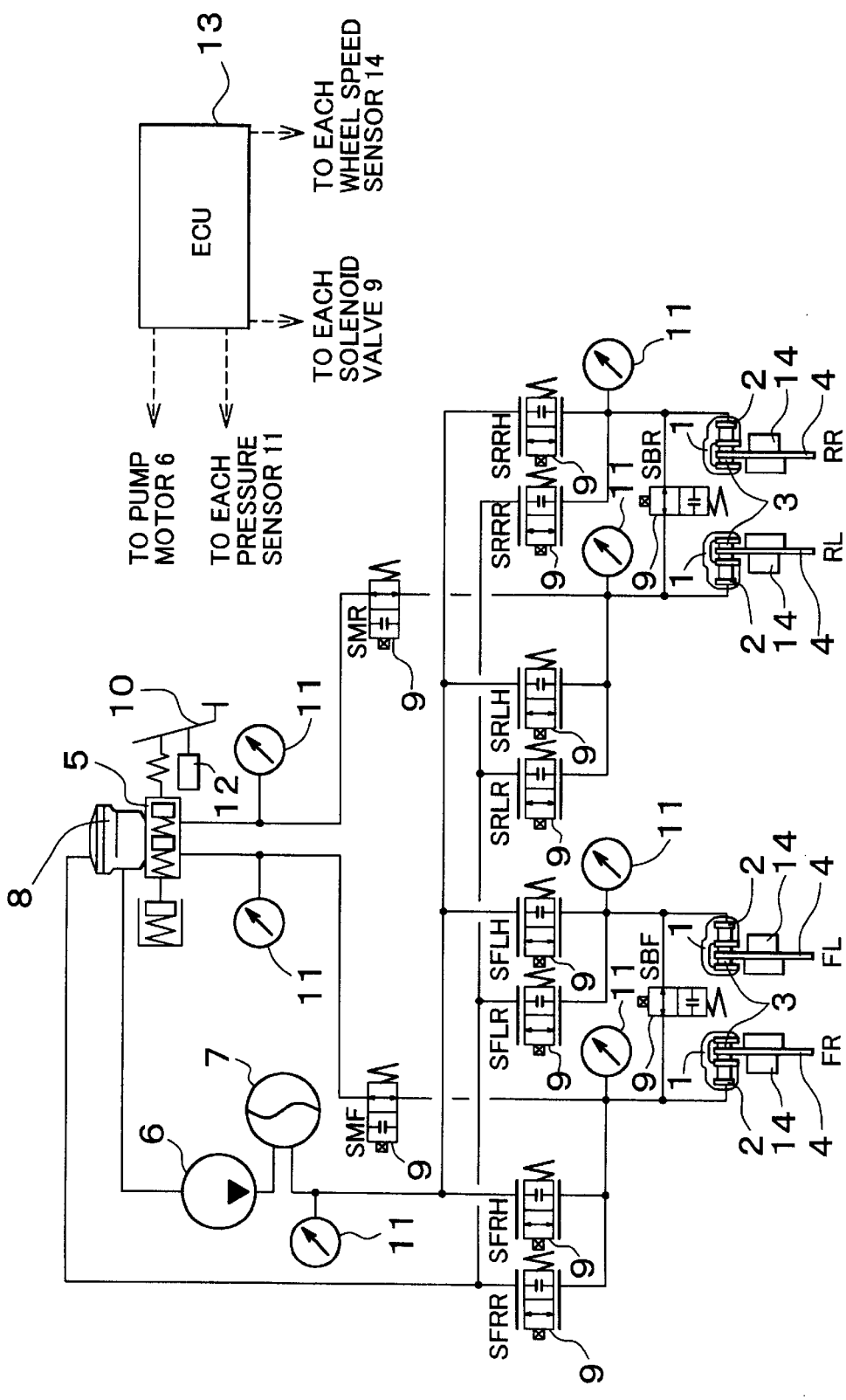
FIG. 1 is a diagram illustrating a construction of an embodiment of the vehicular brake apparatus of the invention.

An embodiment of the vehicular brake apparatus of the invention will first be described. FIG. 1 illustrates a construction of a brake control apparatus in accordance with the embodiment. The brake control apparatus of this embodiment performs brake control by controlling liquid pressure in a hydraulic brake mechanism in which brake pads 3, that is, friction members, are pressed against brake discs 4 connected to wheels, by liquid pressure. This hydraulic brake mechanism is a hydro-booster actuator-type mechanism that has a liquid pressure source in which an increased liquid pressure is always stored.

To brake the wheels, a liquid pressure (hereinafter, referred to as "oil pressure" since a brake oil is used as the brake fluid in this embodiment) is transmitted to a wheel cylinder 2 in each brake caliper 1. Due to the oil pressure, each brake pad (friction member) 3 is pressed against a corresponding brake disc 4 connected to a wheel to brake rotation of the wheel and therefore brake the vehicle. The oil pressure needed for braking is generated by a master cylinder that also serves as a brake booster (hereinafter, simply referred to as "master cylinder") 5 or a liquid pressure source (pump motor and accumulator 7).

The oil pressure generated by the master cylinder 5 or accumulated in the accumulator 7 is transmitted to the wheel cylinder 2 of each wheel by the brake oil serving as a medium, by way of brake piping that is a liquid pressure transmission route. The brake oil to be charged into the brake piping is stored in a reservoir tank 8. A plurality of control valves (solenoid valves) 9 are disposed on the brake piping. The solenoid valves 9 change the oil pressure transmission route, and adjust the oil pressure transmitted to the wheel cylinders 2.

The aforementioned various components or portions will be described below.

The master cylinder 5 is of a generally termed tandem type, containing a booster mechanism for boosting the force of a driving person depressing a brake pedal 10. An inner space of the master cylinder 5 is filled with brake oil. The oil pressure generated in the master cylinder 5 by operating the brake pedal 10 is transmitted to the wheel cylinders 2 of the wheels via two transmission routes (brake pipings). One of the two routes is a transmission route to front wheels (a front right wheel FR and a front left wheel FL), and the other is a transmission route to rear wheels (a rear right wheel RR and a rear left wheel RL). That is, a generally termed front-rear separate type brake piping system is adopted.

The brake piping of each route from the master cylinder 5 is provided with a pressure sensor 11 for detecting the brake oil pressure immediately downstream of the master cylinder 5. A result of detection by each pressure sensor 11 is sent to a computer for performing overall brake control (hereinafter, also termed simply as ECU (electronic control unit)). A stop lamp switch 12 for detecting operation of the brake pedal 10 is connected to the brake pedal 10. When the brake pedal 10 is operated, the stop lamp switch 12 functions as a switch for turning on a stop lamp mounted on a rear portion of the vehicle, and also outputs to the ECU 13 a signal indicating that the brake pedal 10 is operated.

A pump motor 6, that is, a component element of the liquid pressure source, is driven by power from a battery in accordance with an instruction from the ECU 13, and delivers brake oil from the reservoir tank 8 toward the accumulator 7. The accumulator 7, that is, another component element of the liquid pressure source, stores brake oil delivered by the pump motor 6, in an inner space thereof at a predetermined high pressure. A pressure sensor 11 for detecting the oil pressure in the accumulator 7 is mounted on the brake piping, near a downstream side of the accumulator 7. A result of detection by this pressure sensor 11 is also sent to the ECU 13.

The brake piping, forming the liquid pressure transmission routes, is arranged as indicated in FIG. 1. The brake piping is provided with a plurality of solenoid valves 9 for changing between the transmission routes and adjusting the oil pressure transmitted to the wheel cylinders 2. A state indicated in FIG. 1 is a state where all the solenoid valves 9 are off. Each solenoid valve 9 is connected to the ECU 13, and its opening and closing operation is controlled by the ECU 13. In the ensuing description, the solenoid valves 9 are individually identified by their respective reference characters shown in FIG. 1.

A master cylinder (M/C) cut valve (solenoid) SMF is disposed on the brake piping extending from the master cylinder 5 to the front wheels FR, FL. The M/C cut valve SMF selectively allows and prevents transmission of oil pressure from the master cylinder 5 to the wheel cylinders 2 of the front wheels FR, FL. Furthermore, the oil pressure transmitted from the master cylinder 5 to the wheel cylinders 2 can be adjusted by controlling the open close duty ratio of the M/C cut valve SMF. The brake piping extending from the master cylinder 5 toward the wheel cylinders 2 of the front wheels FR, FL meets the brake piping extending from the accumulator 7, at a downstream side of the M/C cut valve SMF. At a further downstream site, the brake piping branches into two pipings connecting to the wheel cylinders 2 of the front wheels FR, FL.

The solenoid valve SBF is disposed on one of the two brake pipings separating immediately. upstream of the wheel cylinders 2. The solenoid valve SBF controls whether to transmit the oil pressure from the master cylinder 5 to the two front wheels FR, FL. The solenoid valve SBF is closed, for example, when the oil pressure transmitted to the front right wheel FR and the oil pressure transmitted to the front left wheel FL are controlled independently of each other by using the oil pressure from the accumulator 7 and other solenoid valves 9.

Similarly, the other brake piping, that is, the brake piping extending from the master cylinder 5 toward the rear wheels RR, RL, is also provided with an M/C cut valve SMR. A brake piping between the rear wheels RR and RL is provided with the solenoid valve SBR. The constructions and functions of these valves are substantially the same as those of the valves provided for the front wheels, and will not be described in detail.

Further provided for the wheel cylinders 2 are hold valves (solenoid valves) SFRH, SFLH, SRRH, SRLH, and pressure-reducing valves (solenoid valves) SFRR, SFLR, SRRR, SRLR, respectively.

The hold valves SFRH, SFLH, SRRH, SRLH are disposed on brake pipings extending between the wheel cylinders 2 and the accumulator 7. The brake pipings extending between the wheel cylinders 2 and the accumulator 7 are joined into a single piping upstream of the hold valves SFRH, SFLH, SRRH, SRLH. The single piping is connected to the accumulator 7. The hold valves SFRH, SFLH, SRRH, SRLH control the oil pressures from the accumulator 7 to the wheel cylinders 2 (that is, perform control regarding whether to transmit the oil pressures or not, the oil pressure increasing rate, the holding of the oil pressures in the wheel cylinders 2, etc.). The oil pressure increasing rate is adjusted based on the open-close duty ratio of each of the hold valves SFRH, SFLH, SRRH, SRLH.

Brake pipings connecting to the reservoir tank 8 are connected, in one-to-one correspondence, to pipings between the wheel cylinders 2 and the hold valves SFRH, SFLH, SRRH, SRLH. The pressure-reducing valves SFRR, SFLR, SRRR, SRLR are disposed on the brake pipings between the wheel cylinders 2 and the reservoir tank 8. The brake pipings extending between the wheel cylinders 2 and the reservoir tank 8 are joined into a single piping upstream of the pressure-reducing valves SFRR, SFLR, SRRR, SRLR. The single piping is connected to the reservoir tank 8. The pressure-reducing valves SFRR, SFLR, SRRR, SRLR return brake oil from the wheel cylinders 2 to the reservoir tank 8, thereby reducing the oil pressures in the wheel cylinders 2. The oil pressure reducing rate can be adjusted based on the open-close duty ratio of each of the pressure-reducing valves SFRR, SFLR, SRRR, SRLR.

Furthermore, the wheel cylinder 2 of each wheel is provided with a pressure sensor 11 for detecting the oil pressure in the wheel cylinder 2. Results of detection by the pressure sensors 11 are sent to the ECU 13. Using the solenoid valves SFRH, SFLH, SRRH, SRLH, SFRR, SFLR, SRRR, SRLR, the mode is changed among a pressure increasing mode of increasing the oil pressures in the wheel cylinders 2, a holding mode of holding constant the oil pressures in the wheel cylinders 2, and a pressure reducing mode of reducing the oil pressures in the wheel cylinders 2.

Each wheel is provided with a wheel speed sensor 14 or detecting the rotational speed of the wheel. Each wheel speed sensor 14 is also able to detect the rotational position of the corresponding wheel (that is, the rotational position of the brake disc 4). Each wheel speed sensor 14 is also connected to the ECU 13. The ECU 13 is formed by a microcomputer, and performs the vehicle braking control and other controls.

Next described will be a control performed by the above-described control apparatus to eliminate the wall thickness difference (variation) of each brake disc 4 or to suppress generation of such a wall thickness variation.

In this control process, a wall thickness variation of each brake disc 4 is detected when the braking of the vehicle is performed. If the wall thickness variation is great, the wall thickness variation is eliminated when the braking of the vehicle is not performed. The "braking of the vehicle" includes not only the braking achieved as a result of operation of the brake pedal 10 performed based on an intention of a driving person, but also the braking of the vehicle performed by the ECU 13 based on its determination regarding a state of each wheel, instead of operation performed by the driving person. That is, the braking of the vehicle herein includes ordinary braking, ABS braking, brake-assist braking, and wheel braking during vehicle stability control.

Figure 2:
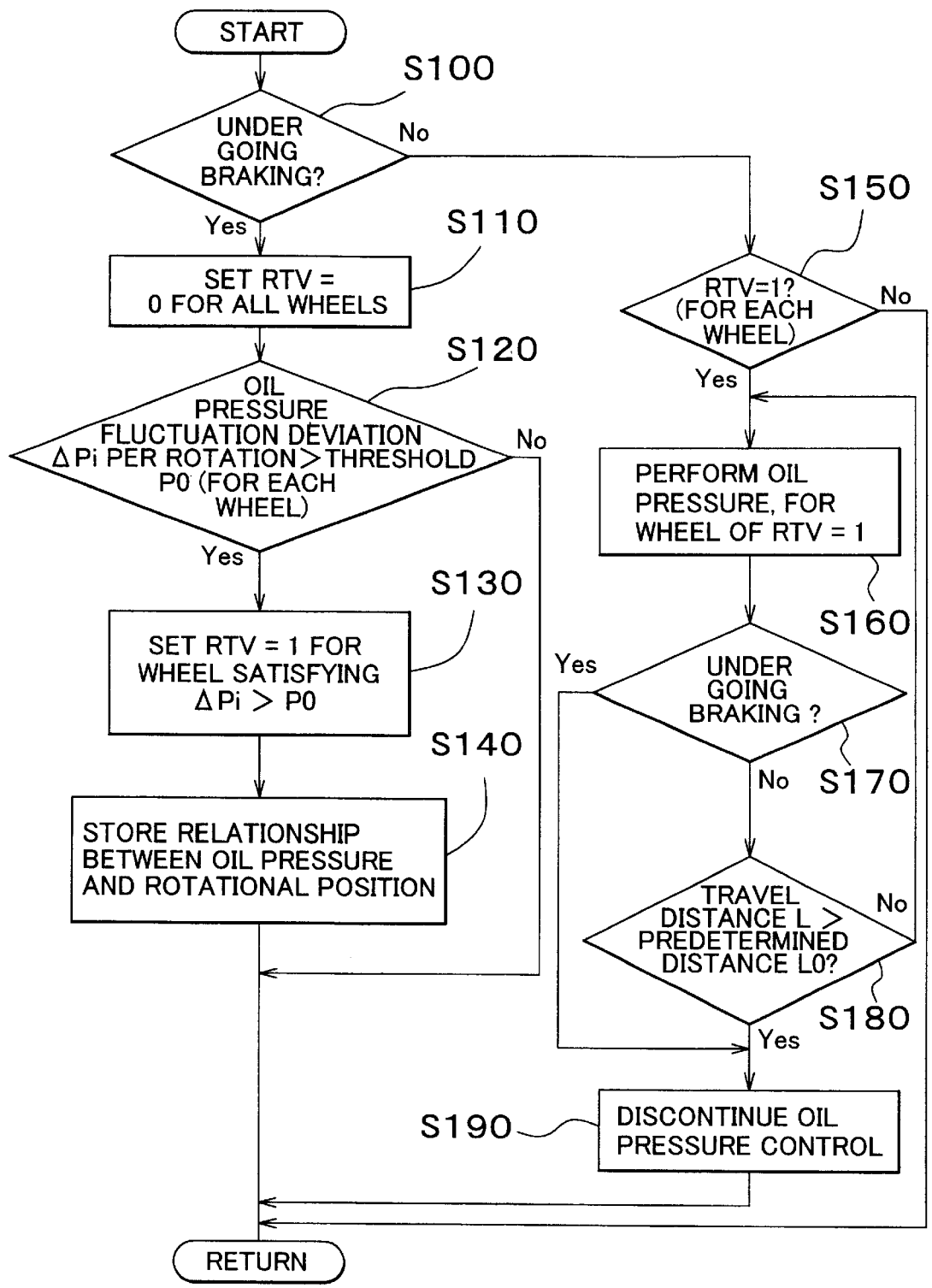
FIG. 2 is a flowchart illustrating a control process performed in the embodiment of the vehicular brake apparatus of the invention.

FIG. 2 shows a flowchart of this control process. The control operation illustrated in this flowchart is repeatedly executed at every predetermined time while the vehicle is traveling. First, the ECU 13 determines whether the vehicle is undergoing braking (step S100). When the vehicle is undergoing braking, that is, if the determination in step S100 is affirmative, the ECU 13 subsequently resets wall thickness variation occurrence flags RTV for all the wheels to "0" (step S110). A process executed following the negative determination in step S100 will be described below.

After step S110, the ECU 13 detects an oil pressure fluctuation occurring in the wheel cylinder 2 of each wheel per rotation of the wheel (brake disc 4), by using the wheel speed sensors 14 and the pressure sensors 11 (see FIG. 3A) separately for the individual wheels. Based on the detected wheel speed and the detected wheel cylinder oil pressure of each wheel, the ECU 13 calculates an oil pressure fluctuation $\Delta Pi$ per rotation of the corresponding brake disc 4. Then, the ECU 13 determines whether the oil pressure fluctuation $\Delta Pi$ with respect to each brake disc 4 is greater then a predetermined threshold P0 (step S120). If a brake disc 4 has a wall thickness variation, the oil pressure in the corresponding wheel cylinder 2 does not equal a target oil pressure Pt but fluctuates during braking. This fluctuation increases with increases in the wall thickness variation.

The threshold P0 is predetermined as a value corresponding to an oil fluctuation that occurs when an impermissible wall thickness variation occurs. If the threshold P0 is preset to a low value, the wall thickness variation can be eliminated before the wall thickness variation grows, so that generation of wall thickness variation can be suppressed. If the affirmative determination is made for a brake disc 4 in step S120, it is considered that the brake disc 4 has a wall thickness variation that needs to be eliminated. Therefore, the ECU 13 sets the wall thickness variation occurrence flag RTV for the brake disc 4 concerned, to "1" (step S130). Conversely, if the negative determination is made for all the wheels in step S120, the ECU 13 ends the present execution of the routine.

The ECU 13 stores a relationship between the brake disc 4 detected in step S120 and the oil pressure fluctuation in the wheel cylinder 2 (see FIG. 3A) (step S140). During fluctuation in the oil pressure with respect to a brake disc 4, an oil pressure increase is caused by the clamping brake pads 3 being pushed back by the brake disc 4. That is, a portion of the brake disc 4 causing the pushback has an increased thickness. On the other hand, an oil pressure decrease is caused when the brake pads 3 clamping the brake disc 4 is further pressed against the brake disc 4 so that the piston in the wheel cylinder 2 is further stroked. That is, a portion of the brake disc 4 causing the oil pressure decrease has a reduced thickness. Thus, a state of the wall thickness of the brake disc 4 is stored in correspondence to the rotational position (angle) θ of the brake disc 4. That is, the ECU 13, the pressure sensors 11 for measuring the oil pressures in the wheel cylinders 2, the wheel speed sensors 14 for detecting the rotational positions of the brake discs 4, etc. function as a wall thickness variation detector.

After step S140, the ECU 13 temporarily ends the routine. When a state of the vehicle that causes the negative determination in step S100, that is, a state where the vehicle is not under braking, is established during repeated execution of the routine, the ECU 13 determines whether the wall thickness variation occurrence flag RTV for each wheel is "1" (step S150). If it is determined in step S150 that there is no wheel with the wall thickness variation occurrence flag RTV being "1", the ECU 13 ends this routine. Conversely, if there is a wheel with the wall thickness variation occurrence flag RTV being "1", that is, if the affirmative determination is made in step S150, the ECU 13 executes the oil pressure control for the wheel with the wall thickness variation occurrence flag RTV being "1", based on the wall thickness variation-oil pressure relationship stored in step S140, in order to eliminate (or suppress) the wall thickness variation of the brake disc 4 (step S160).

Two examples of the oil pressure control executed in step S160 will be described in detail. First described will be an oil pressure control (first embodiment) in which the brake pads 3 are pressed against only a portion of each brake disc 4 corresponding to a portion thereof that has an increased wall thickness, at a constant control oil pressure, as indicated in FIG. 3B. In this case, the portion of the brake disc 4 having an increased wall thickness is planed to reduce the wall thickness variation by raising the oil pressure in the wheel cylinder 2 so as to move the brake pads 3 into contact with the increased wall thickness portion of the brake disc 4.

In this case, the contact between the brake disc 4 and the brake pads 3 hardly brake the rotation of the wheel. That is, the control oil pressure is set to such a level that a sufficient contact is caused therebetween but a driving person does not perceive an uncomfortable feel. As mentioned above, the brake pads 3 are moved into contact with only an increased wall thickness portion of the brake disc 4 in this first embodiment.

Therefore, this oil pressure control eliminates the wall thickness variation of a brake disc 4 by planing (i.e., removing material from) an increased wall thickness portion of the brake disc 4, and avoids contact of the brake pads 3 with a relatively small-wall thickness portion of the brake disc 4, so that the wear of the brake disc 4 can be reduced. Furthermore, when the brake pads 3 are set in contact with the brake disc 4, the control oil pressure is kept at a constant value. Therefore, complication of the control is avoided. Hence, the wall thickness variation of each brake disc can be eliminated without causing a great amount of load on the control system, such as the processes executed by the ECU 13.

Figure 3A:
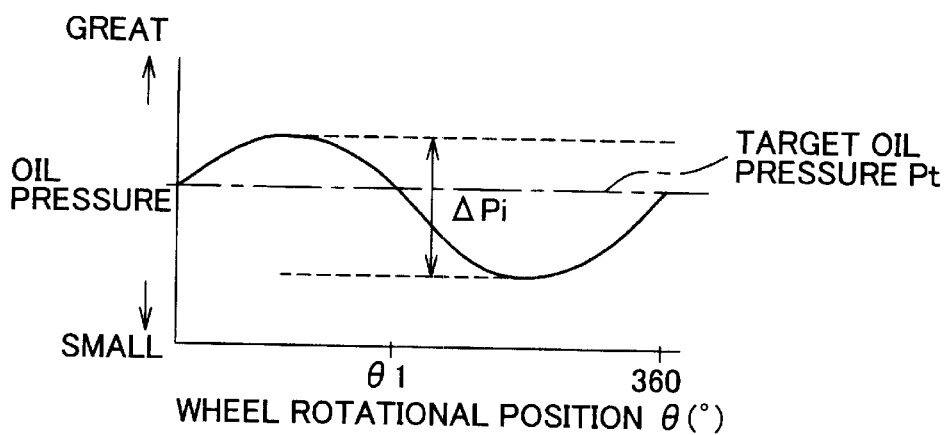
FIG. 3A is a graph indicating a relationship between the oil pressure and the rotational position of a wheel (brake disc rotational position) at the time of detection.
Figure 3B:
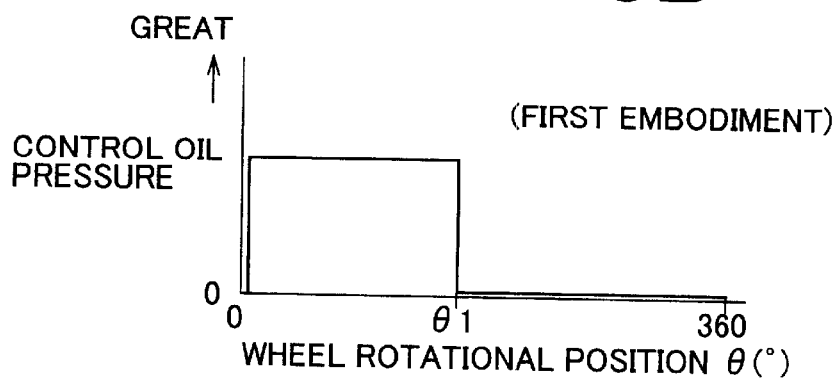
FIG. 3B is a graph indicating a relationship between the oil pressure and the wheel rotational position (brake disc rotational position) during braking in a first embodiment.
Figure 3C:
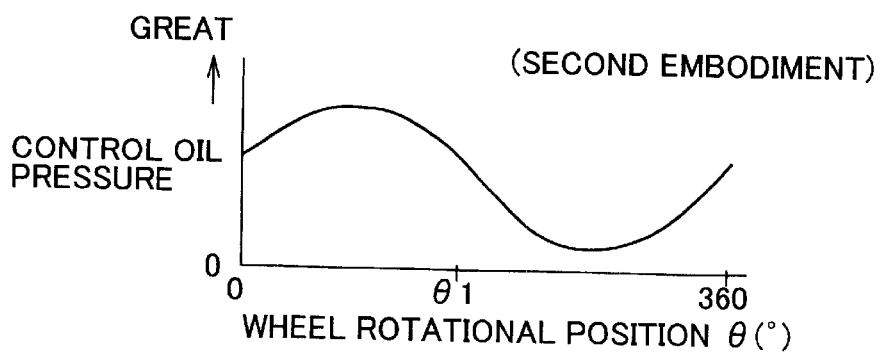
FIG. 3C is a graph indicating a relationship between the oil pressure and the wheel rotational position during braking in a second embodiment.

Next described will be an oil pressure control (second embodiment) in which the force pressing the brake pads 3 against a brake disc 4 is varied so as to strongly contact (press) the brake pads 3 with (against) an increased-wall thickness portion of the brake disc 4 and weakly contact (press) the brake pads 3 with (against) a relatively small-wall thickness portion of the brake disc 4, as indicated in FIG. 3C. In this embodiment, the oil pressure in the wheel cylinder 2 is changed and controlled based on the wall thickness variation-oil pressure relationship stored in step S140. Therefore, the brake pads 3 are placed in contact with the increased wall thickness portion of the brake disc 4 by a strong pressing force, and are placed in contact with the relatively small wall thickness portion of the brake disc 4 by a weak pressing force, so that the wall thickness variation of the brake disc 4 is quickly eliminated.

The contact between the brake pads 3 and the brake disc 4 is at such a level that a driving person will not be dismayed. Although the control oil pressure is variably controlled in correspondence to the wall thickness variation of the brake disc 4 until the brake disc 4 completes a full rotation in the control indicated in FIG. 3C, the brake pads 3 may be out of contact with the brake disc 4 when the control oil pressure is low. Furthermore, although in the second embodiment, the control oil pressure is variably controlled until the brake disc 4 completes a full rotation, it is also conceivable to variably control the control oil pressure only with respect to an increased-wall thickness portion of the brake disc 4.

The oil pressure in the wheel cylinder 2 can be set to control oil pressures as indicated in FIG. 3B or 3C in the first and second embodiments described above, by transmitting the oil pressure in the accumulator 7 to the wheel cylinders 2 concerned, through the use of hold valves SFRH, SFLH, SRRH, SRLH and the pressure-reducing valves SFRR, SFLR, SRRR, SRLR, separately for the wheels. That is, the liquid pressure source (the pump motor 6 and the accumulator 7), the solenoid valves 9, etc. are controlled to control the state of contact between the brake discs 4 and the brake pads 3.

FIG. 3A indicates actual oil pressure in the wheel cylinder 2, whereas FIGS. 3B and 3C indicate control oil pressure (target oil pressure). The vertical axis in the graph of FIG. 3A and the vertical axes in the graphs of FIGS. 3B and 3C are not necessarily the same in scale.

Referring back to the flowchart of FIG. 2, after the control in step S160 is started, the ECU 13 determines again whether the vehicle is undergoing braking (step S170). If the vehicle is undergoing braking, that is, if the vehicle braking has been started in step S170 although the vehicle was not undergoing braking in step S100, the ECU 13-stops the control of step S160 (step S190), and then exits the routine. Conversely, if the vehicle braking is not started, the ECU 13 determines whether the travel distance L after the start of the oil pressure control in step S160 is greater than a predetermined distance L0 (step S180).

The process of step S180 is executed to prevent continuation of the oil pressure control beyond the traveling time of the predetermined distance L0, because if the oil pressure control for eliminating the wall thickness variation of a brake disc 4 is continued for a long time, there is a danger of excessive planing of the brake disc 4 or of the brake pads 3. While the affirmative determination is not made in either step S170 or step S180, that is, while the vehicle is not undergoing braking and the travel distance L after the start of the oil pressure control is less than the predetermined distance L0, the above-described oil pressure control in step S160 is continued.

In some cases, for example, during driving on a highway or the like, it is conceivable that the vehicle continuously travels a considerably long distance without being braked. Considering such cases, an upper limit regarding execution of the oil pressure control is set based on the travel distance L through the provision of step S180. In this manner, drawbacks caused by continuous contact between a brake disc 4 and the brake pads 3 for a long time are prevented. If the determination in step S180 is affirmative, the ECU 13 discontinues the oil pressure control in step S190, and ends the present execution of the routine.

Thus, a wall thickness variation of each brake disc 4 can be eliminated (or suppressed) by causing the brake pads 3 to contact an increased-wall thickness portion of the brake disc 4 with a stronger force than a relatively small-wall thickness portion thereof (including keeping the brake pads 3 out of contact with a relatively small-wall thickness portion of the brake disc 4). Hence, drawbacks caused by the wall thickness variation of a brake disc 4, such as brake vibrations and the like, can be prevented.

The vehicular brake apparatus of the invention is not limited to the foregoing embodiments. For example, although in the foregoing embodiments, the solenoid valves 9 are used to control the brake oil pressure, any control valves may be used as long as the valves are able to selectively allow and prevent transmission of brake oil pressure and to adjust the oil pressure. Furthermore, although in the foregoing embodiments the brake piping method is a front-rear separate method, it is also possible to adopt other piping methods, such as an X-piping method or the like.

Furthermore, in the foregoing embodiments, the control for eliminating the wall thickness variation of a brake disc 4 is performed when the vehicle is not undergoing braking. However, it is also possible to perform the control for eliminating the wall thickness variation while the brake disc and the friction member are in contact during the braking of the vehicle. In this case, a pressing force for eliminating (or suppressing) the wall thickness variation of the brake disc is applied, in addition to the pressing force applied to press the friction member against the brake disc so as to achieve a friction force needed to brake the vehicle. However, performing the oil pressure control while the vehicle is not undergoing braking as described above is normally more preferable because the vehicle braking control does not become an external disturbance for the wall thickness variation eliminating control.

Furthermore, although the foregoing embodiments have been described in conjunction with the braking control mechanism for a hydraulic brake mechanism, the braking control apparatus of the invention is not limited to a hydraulic brake mechanism. For example, in a mechanism in which wheels are driven by an electric motor, a wall thickness state detector may detect a state of wall thickness of a brake disc from a torque fluctuation of the electric motor caused by rotations of the wheels while a friction member is pressed against the brake disc. This braking control apparatus includes a torque detector for detecting a torque of the electric motor, and a wheel speed sensor for detecting the rotational position of the brake disc, and detects a torque fluctuation of the electric motor based on the torque of the electric motor and the rotational position of the brake disc. As for the torque fluctuation, the torque of the electric motor occurring together with rotation of the wheel increases as the brake disc has a greater thickness since a greater thickness causes a greater contact pressure between the brake disc and the friction member. If the thickness of the brake disc is small, the contact pressure between the brake disc and the friction member is low, so that the torque of the electric motor is small. In this fashion, a state of wall thickness of a brake disc can be detected even if a friction member is caused to contact (is pressed against) the brake disc through the use of a solenoid valve or the like during vehicle braking.

In the illustrated embodiment, the controller (ECU 13) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hard-wired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. On the contrary, the invention is intended to cover various modifications and equivalent arrangements. In addition, while the various elements of the invention are shown in various combinations and configurations, which are exemplary, other combinations and configurations, including more, less or only a single element, are also within the spirit and scope of the invention.

What is claimed is:

1. A vehicular brake apparatus comprising:
   a disc brake mechanism that brakes rotation of a wheel by pressing a friction member against a brake disc;
   a wall thickness detector that detects a state of wall thickness of the brake disc; and
   a controller that controls a state of contact between the brake disc and the friction member based on the state of wall thickness of the brake disc detected by the wall thickness detector, the controller causing the friction member to contact a relatively great wall thickness portion of the brake disc more strongly than the controller causes the friction member to contact a relatively small wall thickness portion of the brake disc.

2. A vehicular brake apparatus according to claim 1, wherein the controller controls the state of contact between the brake disc and the friction member while a vehicle is not undergoing braking.

3. A vehicular brake apparatus according to claim 2, further comprising a start detector that detects a start of braking of the vehicle, wherein when a start of braking of the vehicle is detected by the start detector, the state of contact between the brake disc and the friction member controlled by the controller is discontinued.

4. A vehicular brake apparatus according to claim 1, wherein the controller causes the friction member to contact the portion of the brake disc having the relatively great wall thickness, and does not cause the friction member to contact the portion of the brake disc having the relatively small wall thickness.

5. A vehicular brake apparatus according to claim 1, wherein the controller variably controls a force of the friction member pressing the brake disc in correspondence to a wall thickness variation of the brake disc detected by the wall thickness detector.

6. A vehicular brake apparatus according to claim 1, wherein:

the disc brake mechanism is a hydraulic brake mechanism that presses the friction member against the brake disc by raising a brake liquid pressure in a wheel cylinder, the wall thickness detector detects the state of wall thickness of the brake disc from a variation in the brake liquid pressure during braking of a vehicle, and the controller controls the state of contact between the brake disc and the friction member by adjusting the brake liquid pressure.

7. A vehicular brake apparatus according to claim 6, further comprising:

a pressure detector that detects the brake liquid pressure in the wheel cylinder; and a wheel speed sensor that detects a rotational position of the brake disc, wherein the wall thickness detector detects the state of wall thickness of the brake disc based on the brake liquid pressure detected and the rotational position detected.

8. A vehicular brake apparatus according to claim 1, further comprising a distance detector that detects a vehicle travel distance after a contact state control by the controller starts, wherein the controller discontinues the state of contact when the vehicle travel distance detected exceeds a predetermined distance.

9. A vehicular brake apparatus comprising:

a disc brake mechanism that presses a friction member against a brake disc to brake rotation of a wheel by raising a brake liquid pressure in a wheel cylinder;

a fluctuation detector that detects a brake fluctuation occurring when rotation of the wheel is braked by the disc brake mechanism;

a wall thickness state detector that detects a state of wall thickness of the brake disc based on the brake fluctuation detected by the fluctuation detector; and a controller that controls the disc brake mechanism so that a pressing force is exerted on the friction member actively based on the state of the wall thickness of the brake disc, in a rotational direction of the brake disc, detected by the wall thickness detector so that the friction member is caused to contact a relatively great wall thickness portion of the brake disc more strongly than the friction member is caused to contact a relatively small wall thickness portion of the brake disc.

10. A vehicular brake apparatus according to claim 9, wherein:

the fluctuation detector detects a fluctuation in the brake liquid pressure as the brake fluctuation, and the wall thickness state detector detects the state of wall thickness of the brake disc based on the fluctuation in the brake liquid pressure detected.

11. A vehicular brake apparatus according to claim 10, wherein the fluctuation detector comprises:

a pressure detector that detects the brake liquid pressure in the wheel cylinder; and a wheel speed sensor that detects a rotational position of the brake disc, wherein the wall thickness detector detects the fluctuation in the brake liquid pressure based on the brake liquid pressure detected and the rotational position detected.

12. A control method for a vehicular brake apparatus having a disc brake mechanism that brakes rotation of a wheel by pressing a friction member against a brake disc, the method comprising:

detecting a state of wall thickness of the brake disc; and controlling a state of contact between the brake disc and the friction member based on the detected state of wall thickness of the brake disc so that the friction member is controlled to contact a relatively great wall thickness portion of the brake disc more strongly than the friction member is controlled to contact a relatively small wall thickness portion of the brake disc.

13. A control method according to claim 12, wherein the control of the state of contact is performed while a vehicle is not undergoing braking.

14. A control method according to claim 12, wherein during control of the state of contact, the friction member is caused to contact the relatively great wall thickness portion of the brake disc, and is not caused to contact the relatively small wall thickness portion of the brake disc.

15. A control method according to claim 12, wherein during control of the state of contact, a force of the friction member pressing the brake disc is variably controlled in correspondence to a variation in the wall thickness of the brake disc.

16. A control method according to claim 12, wherein the disc brake mechanism is a hydraulic brake mechanism that presses the friction member against the brake disc by raising a brake liquid pressure in a wheel cylinder, and:

the step of detecting the state of wall thickness of the brake disc includes detecting the state of wall thickness of the brake disc from a variation in the brake liquid pressure during braking of a vehicle, and the control step controls the state of contact between the brake disc and the friction member by adjusting the brake liquid pressure.

17. A control method according to claim 16, further comprising:

detecting the brake liquid pressure in the wheel cylinder; and detecting a rotational position of the brake disc, the state of wall thickness of the brake disc being determined based on the brake liquid pressure detected and the rotational position detected.

18. A control method according to claim 12, further comprising detecting a vehicle travel distance after a contact state control by the controlling step is started, wherein the controlling step includes discontinuing the state of contact when the detected vehicle travel distance exceeds a predetermined distance.

* * * * *